May 10, 1932.  H. M. LEMASTER  1,857,558
WATERING FOUNTAIN
Filed May 14, 1931

Inventor
Howard M. Lemaster.

By G. K. Bond
Attorney

Patented May 10, 1932

1,857,558

UNITED STATES PATENT OFFICE

HOWARD M. LEMASTER, OF FOREST GLEN, MARYLAND

WATERING FOUNTAIN

Application filed May 14, 1931. Serial No. 537,418.

This invention relates to certain new and useful improvements in drinking fountains for pigeons, poultry and birds, and it has for its objects among others to provide a simple, cheap, yet efficient device of this character, adapted to serve a manifold purpose—to provide a continuous flow of fresh water, furnished clean to the pigeons at all times, with very small volume of water going to waste, readily installed in buildings or in the open, on the lawn or any other place where it may be desired to locate it. It embodies no springs or floats and can be quickly installed anywhere where there is a source of water supply.

Provision is made to prevent waste of the water either when the pigeons are drinking, or at all other times, the flow being capable of ready adjustment to suit varying conditions.

The fountain is capable of manufacture at small cost, without employment of specially constructed parts, and embodies a cover which serves a two fold purpose, that of protecting the water in the fountain from being fouled, and as a means for regulating the flow in drops, when desired. It can readily be installed to any supply pipe with water under pressure or gravity.

The device is simple in the extreme, there is no occasion for its getting out of order, and requires no attention whatsoever after being once installed.

Other objects and advantages of the invention will hereinafter appear and the novel features thereof will be specifically defined by the appended claims.

The invention, in its preferred form, is clearly illustrated in the accompanying drawings, which, with the numerals of reference marked thereon, form a part of this specification, and in which Figure 1 is a perspective view of the improved watering fountain constructed in accordance with the present invention.

Like numerals of reference indicate like parts throughout the several views.

Figure 1:
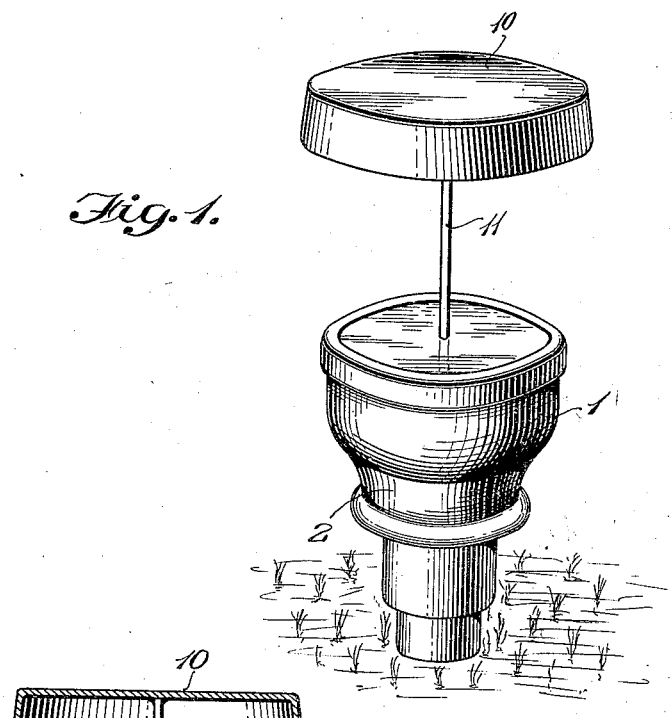

Referring to the drawings 1 designates a bowl or receptacle, the shape and size of which is capable of various embodiments. In the present instance it is shown as of the general shape of a bird fountain, although this is immaterial.

The downward extension 2 of this fountain is internally threaded as seen at 3, and into this extension is screw threaded a fitting 4, which may be an ordinary fitting such as in common use in similar cases where a tight joint is required. The threads of this connection are leaded or otherwise treated to secure a water tight joint between the two interfitting members.

Figure 2:
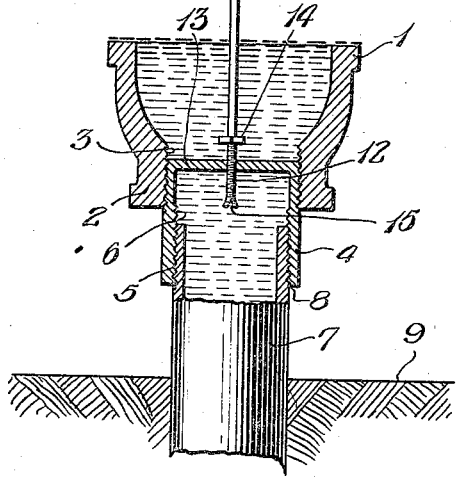
Figure 2 is a substantially central vertical section through the same.

The interior of this fitting 4 is internally threaded as seen at 6 for cooperation with the threads 6 of the fitting 7 and the threads of these two members at this point are leaded or otherwise treated to insure a water tight joint between them, as indicated at 8 in Figure 2.

9 designates a support, such as a floor, or it may be the earth, through which the fitting 7 extends, the said fitting 7 being connected with any suitable source of water supply, either under pressure, or a gravity flow.

10 is a member which serves as a cover; it may be of any suitable shape and material and size well suited to the purpose for which it is employed in this connection. It is supported by the rod 11, the upper end of which is affixed to the said cap or cover 10 in any suitable manner. The lower end of this rod 11 is screw threaded as seen at 12 in Figure 2 and extended through the upper wall 13 of the member 4 as seen in Figure 2.

14 is a nut adjusted on the rod 11 above the cross member or end 13 of the member 4 as seen clearly in Figure 2, and below this member 13 the end of the rod 11 is spread as at 15 so that while the rod may be vertically adjusted to a certain extent it cannot be entirely withdrawn from the member 13. This permits of ready adjustment by the cap 10 to regulate the flow of the water in drops.

The interfitting of the threads of the lower end of the member 11 is such that there is at all times permitted a restricted flow of the water between threads of the portion 12 and the opening in the end 13 of the member 4; turning of the member 11 regulates the flow in drops.

Turning of the member 10 in one direction or the other will increase or diminish the amount of water that will flow into the bowl or receptacle 1.

Figure 3:
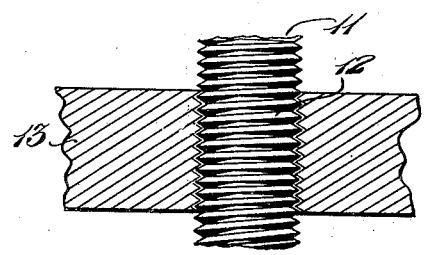
Figure 3 is an enlarged sectional detail to better illustrate the provision for the flow of water slowly into the cup.

In Figure 3 I have shown exaggerated the provision for the flow of the water from the inlet pipe to the bowl.

The water enters the fountain or bowl by passing around the threads of the stem; the nut 14 on the stem acts as a stop when the stem is turned down and thus serves to stop the flow of the water entirely.

The slot or spreading 15 of the inner end of the stem or rod 11 prevents the stem from working free of the receptacle.

Modifications in detail may be resorted to without departing from the spirit of the invention or sacrificing any of its advantages.

What is claimed as new is:—

1. A watering fountain embodying a receptacle, means for connection with a source of water supply, and movable means interposed between said receptacle and source of supply for permitting only restricted seepage or peripheral flow of water to the receptacle, said means embodying provision for entirely stopping such flow said means having provision to prevent its removal.

2. A watering fountain embodying a receptacle, an apertured fitting therein, provision for connection of the fitting with a source of water supply, a cover member, and movable means connecting said cover with said fitting for controlling the flow of water to the receptacle and mounted movably to stop the flow entirely.

3. A watering fountain, embodying a receptacle for water, an apertured fitting connected with the lower end thereof and forming its bottom, said fitting being adapted for connection with a source of water supply, and movable means for controlling the flow of water to the receptacle, said means having provision for limiting the movement of said controlling means in both directions.

4. A watering fountain, embodying a receptacle for water, an apertured fitting connected with the lower end thereof and forming its bottom, and a connection with a source of water supply, and movable means for controlling the flow of water to the receptacle, said means having provision for limiting the movement of said controlling means in both directions and provision for preventing its removal from the device.

5. A watering fountain of the character described, embodying a receptacle, a cover for said receptacle, connection for a source of water supply, and means under the control of said cover for controlling the flow, said means allowing such flow by seepage only.

6. A watering fountain of the character described, embodying a receptacle, connection for a source of water supply, means for controlling the flow, said means allowing such flow by seepage only said means having provision to prevent its removal.

In testimony whereof, I affix my signature.

HOWARD M. LEMASTER.